US010140187B1

(12) United States Patent
Chan et al.

(10) Patent No.: US 10,140,187 B1
(45) Date of Patent: Nov. 27, 2018

(54) TECHNIQUES FOR SYSTEM BACKUP (71) Applicant: Symantec Corporation, Mountain View, CA (US)

(72) Inventors: Leo Chan, Chevy Chase, MD (US); Ilya Sokolov, Boston, MA (US)

(73) Assignee: SYMANTEC CORPORATION, Mountain View, CA (US)

( * ) Notice: Subject to any disclaimer, the term of this patent is extended or adjusted under 35 U.S.C. 154(b) by 429 days.

(21) Appl. No.: 14/788,241

(22) Filed: Jun. 30, 2015

(51) Int. Cl.
G06F 17/00 (2006.01)
G06F 7/00 (2006.01)
G06F 11/14 (2006.01)
G06F 17/30 (2006.01)

(52) U.S. Cl.
CPC .... G06F 11/1458 (2013.01); G06F 17/30371 (2013.01); G06F 2201/84 (2013.01)

(58) Field of Classification Search
CPC .......... G06F 11/1458; G06F 17/30371; G06F 2201/84
USPC ......................................................... 707/654
See application file for complete search history.

(56) References Cited

U.S. PATENT DOCUMENTS

| | | | |
|---|---|---|---|
| 7,941,621 B1 | 5/2011 | Gipp et al. | |
| 8,244,998 B1 | 8/2012 | Krinke, II | |
| 8,352,692 B1 | 1/2013 | Jordan | |
| 8,380,678 B2 | 2/2013 | Manson | |
| 8,903,777 B1 | 12/2014 | Searls et al. | |
| 9,684,563 B1 * | 6/2017 | Wartnick | G06F 1/3212 |
| 2009/0089315 A1 * | 4/2009 | Jeffery | G06F 17/30011 707/999.102 |
| 2012/0310889 A1 * | 12/2012 | McNeil | H04L 67/2857 707/639 |
| 2012/0310896 A1 * | 12/2012 | Freedman | G06F 11/1402 707/679 |
| 2013/0036095 A1 * | 2/2013 | Titchener | G06F 11/1451 707/654 |
| 2015/0205674 A1 * | 7/2015 | Schroth | G06F 11/1458 707/649 |
| 2015/0370649 A1 * | 12/2015 | Schroth | G06F 11/1471 707/654 |
| 2016/0179631 A1 * | 6/2016 | Sun | G06F 11/1471 707/648 |
| 2017/0177867 A1 * | 6/2017 | Crofton | G06F 21/565 |

\* cited by examiner

*Primary Examiner* — Pavan Mamillapalli
(74) *Attorney, Agent, or Firm* — Meyertons Hood Kivlin Kowert and Goetzel PC; Rory D. Rankin (57) ABSTRACT

Techniques for system backup are disclosed. In one embodiment, the techniques may be realized as a method including identifying a particular characteristic of a particular modification of a default automated procedure for selecting files to include in an off-site backup, wherein the identifying is based at least in part on an aggregation of data from many client devices as to how each of many users deviated from the default automated selection procedure; receiving a first system profile for a first client device; identifying the particular characteristic in the first system profile; and based on identifying the particular characteristic in the first system profile, applying a modified default automated selection procedure to the first client device, the modified default automated selection procedure including the particular modification identified with the particular characteristic.

19 Claims, 4 Drawing Sheets

TECHNIQUES FOR SYSTEM BACKUP

FIELD OF THE DISCLOSURE

The present disclosure relates generally to data backup and, more particularly, to techniques for system backup.

BACKGROUND OF THE DISCLOSURE

For any computer system with significant digital resources, producing and maintaining an off-site backup is considered an important risk mitigation practice. Cloud-based backup solutions allow for backups of files to be made and transferred to internet-accessible storage space. However, while bandwidth and accessibility have greatly increased, cloud storage space is still a limited resource. The result is that most enterprise backup procedures must be selective, identifying which files are to be included in the backup and which files are not.

Many implementations involve a set of default backup policies by which certain criteria (such as, for example, file type, location, and history) are used to determine which files to select for backup. Various backup systems also allow the user to modify these default policies, either by adding additional criteria for backup or by selecting and/or deselecting particular files for backup. While these customizations may be sufficient for each user, they can be time-consuming. The default policies may not be suitable for many users, and may fail to take into account important changes in file types and usages without manual intervention.

In view of the foregoing, it may be understood that there may be significant problems and shortcomings associated with current data backup technologies.

SUMMARY OF THE DISCLOSURE

Techniques for system backup are disclosed. In one embodiment, the techniques may be realized as a method including identifying a particular characteristic of a particular modification of a default automated procedure for selecting files to include in an off-site backup, wherein the identifying is based at least in part on an aggregation of data from many client devices as to how each of many users deviated from the default automated selection procedure; receiving a first system profile for a first client device; identifying the particular characteristic in the first system profile; and based on identifying the particular characteristic in the first system profile, applying a modified default automated selection procedure to the first client device, the modified default automated selection procedure including the particular modification identified with the particular characteristic.

In accordance with other aspects of this embodiment, the particular characteristic can be the presence of a particular application.

In accordance with other aspects of this embodiment, the particular modification is backing up files having a particular extension type that is not automatically identified for backup by the default automated selection procedure.

In accordance with other aspects of this embodiment, applying a modified default automated selection procedure to the first client device can include providing to the client device a set of default backup policies including a contingency matching the particular characteristic to the particular modification. The client device can apply the particular modification based on identifying the particular characteristic in the system profile of the client device.

In accordance with other aspects of this embodiment, the particular modification can be backing up files having particular metadata reflecting recent user interaction with the file.

In accordance with other aspects of this embodiment, the particular characteristic is a user characteristic.

In accordance with another embodiment, the techniques may be realized as an article of manufacture including at least one processor readable storage medium and instructions stored on the at least one medium. The instructions may be configured to be readable from the at least one medium by at least one processor and thereby cause the at least one processor to operate so as to carry out any and all of the steps in the above-described method.

In accordance with another embodiment, the techniques may be realized as a system comprising one or more processors communicatively coupled to a network; wherein the one or more processors are configured to carry out any and all of the steps described with respect to any of the above embodiments.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

A client backup module manages the backup process on a particular client device. Additionally, the client backup module records changes to the backup policy made by the user and corresponding elements of the client system, reporting both the system profile and the user behavior to a centralized administration server, which uses the data to further modify the default backup policy and generate additional default policy rules to better emulate user selection.

Figure 1:
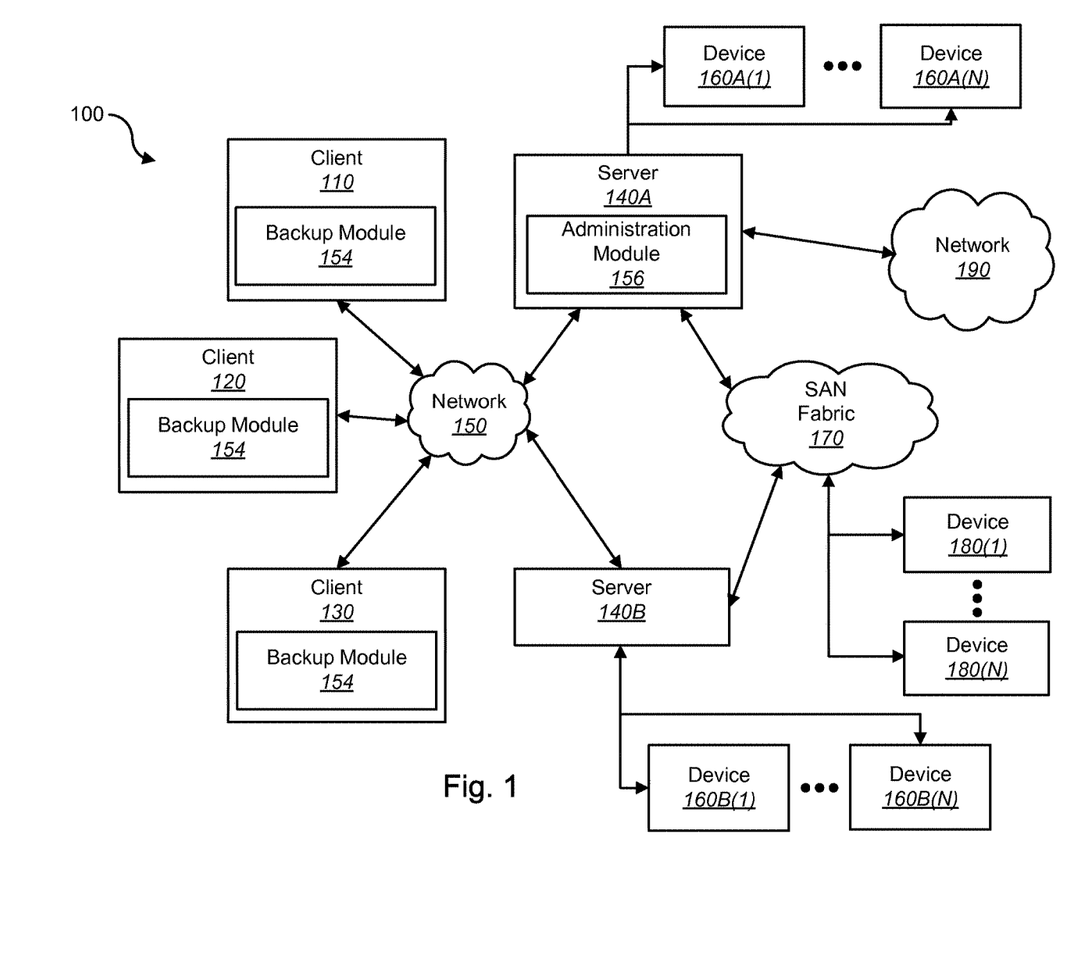
FIG. 1 shows a block diagram depicting a network architecture in accordance with an embodiment of the present disclosure.

FIG. 1 shows a block diagram depicting a network architecture 100 in accordance with an embodiment of the present disclosure. FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
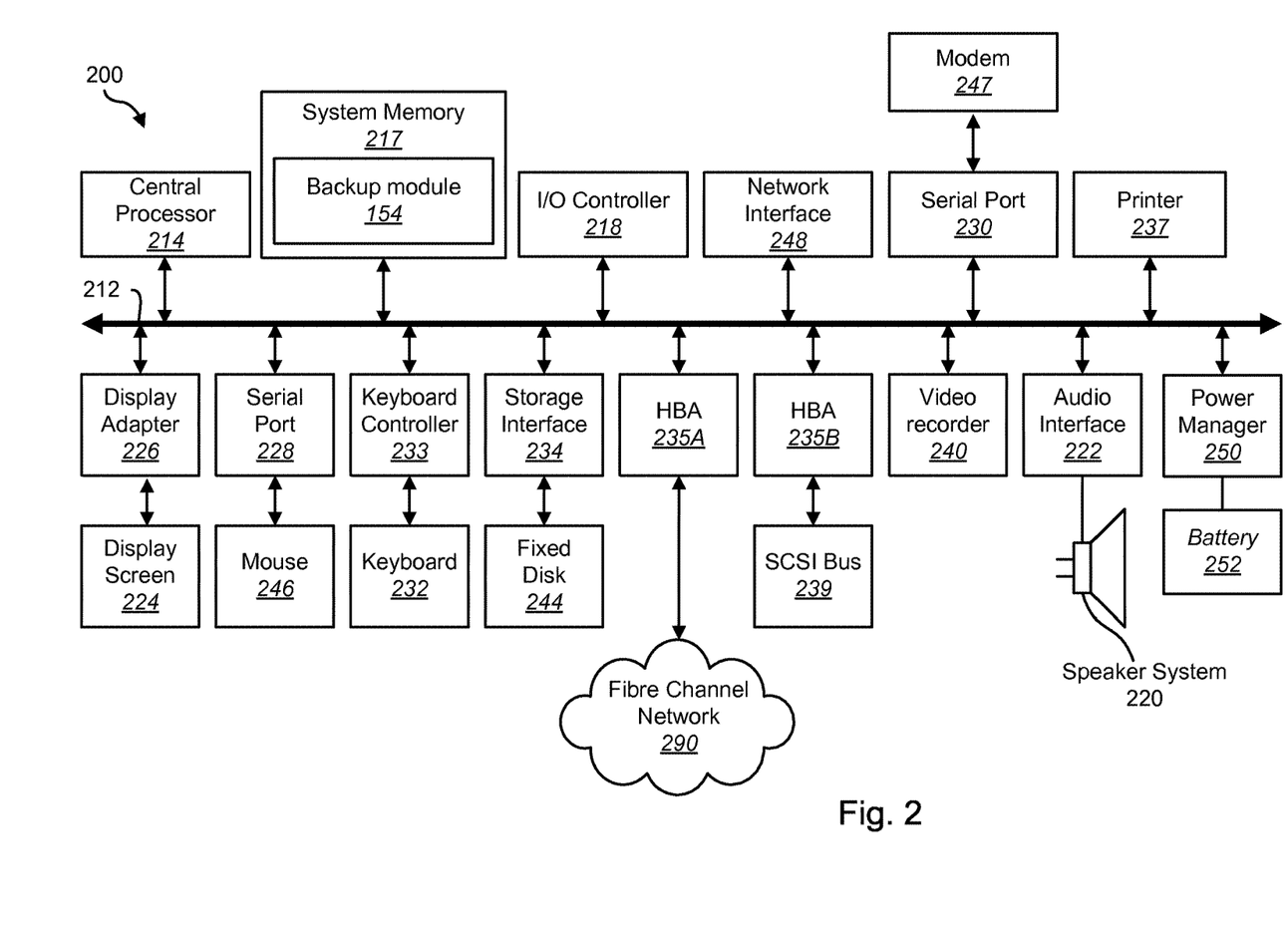
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, laptop computers, servers, other computers, or other devices coupled via a wireless or wired connection to network 150. Clients 110, 120, and 130 may receive data from user input, a database, a file, a web service, and/or an application programming interface. In some implementations, clients 110, 120, and 130 may specifically be network-capable mobile devices such as smartphones or tablets.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and 130 may contain one or more portions of software for implementation of file backup systems and procedures such as, for example, backup module 154. Further, an administration module 156 can reside at a network centric location such as server 140A. For example, server 140A may be a server, a firewall, a gateway, or other network element that may perform one or more actions to support management of system and network security elements. According to some embodiments, network 190 may be an external network (e.g., the Internet) and server 140A may be a gateway or firewall between one or more internal components and clients and the external network. According to some embodiments, analysis and approval of resource references including DLP agent 154 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a printer 237 operative to receive data and/or images for printing, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a printer 237, a removable disk unit (e.g., Universal Serial Bus drive), or other storage medium. According to some embodiments, a backup module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244 or optical disk 242. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptible Power Supply (UPS) located either local to or remote from computer system 200. In such embodiments, power manager 250 may provide information about a power level of an UPS.

Figure 3:
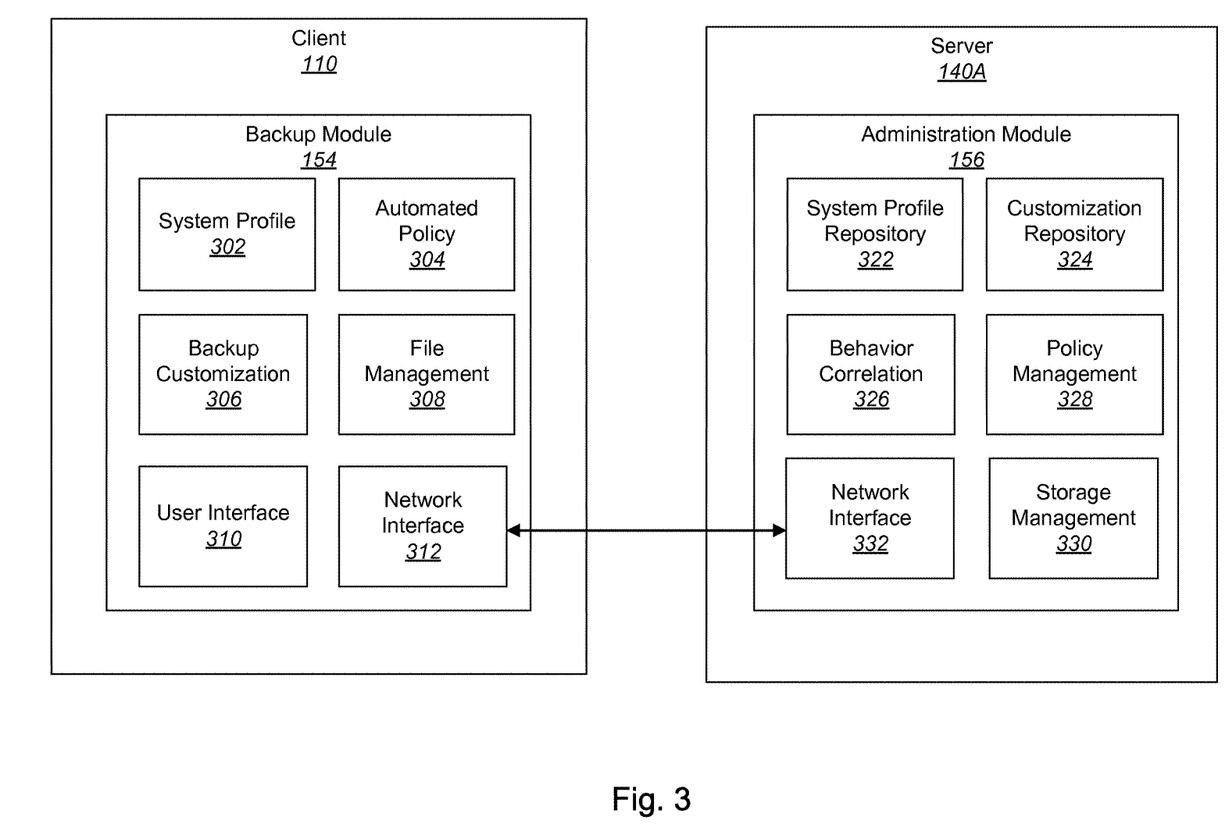
FIG. 3 shows a block diagram illustrating backup and administration modules in accordance with an embodiment of the present disclosure.

FIG. 3 shows an example of a client device 110 which includes a backup module 154 in network communication with an administration module 156 residing on a server 140A. The backup module 154 includes a variety of component modules which carry out various aspects of a backup process for the client device 110.

The backup module 154 can include a system profile module 302 which collects and maintains information about the client system. This may include data such as the operating system, what applications are installed on the system and what versions, and how the system is generally configured. This data may be anonymized and periodically sent to the administration module 156 for storage in a repository 322. The system profile repository 322 can include system profile data from a plurality of different client systems with backup modules connected over the network to the server 140A. Network interfaces 312, 332 manage communication between the modules.

An automated policy module 304 can maintain updated information on the default policies used to select files for backup. Backup policies are known in the art to select files to back up on the basis of known file extensions, locations, and other metadata.

In accordance with implementations of the present invention, the automated policy module may further allow for additional backup policies based on data associated with the particular client's system profile, as maintained by the system profile module 302. As an example, the automated policy could designate files with a particular file extension for backup only if a particular application is listed in the system profile—that is, the files are automatically backed up if the system profile includes the application and not automatically backed up otherwise. A variety of contingent backup policies are possible depending on the quality and extent of the system profile data.

While the automated policy module 304 maintains default backup policies, the backup module 154 provides the flexibility to allow the user to alter the policies and selections made. A backup customization module 306, by means of the user interface 310, provides the user with a selection of files that will be backed up as well as the set of policies in effect. The user can modify these policies and select and deselect particular files for backup. The backup customization module 306 keeps track of these changes and makes sure the customized rather than the default policies are applied during file backup.

In addition to maintaining the user's customized selections, the customization module also periodically provides customization data (properly formatted and anonymized) to the customization repository 324 of the administration module 156, which is stored along with customization data from other client devices.

File backup processes may be carried out periodically or on demand. Upon initialization of a backup procedure, a file management module 308 accesses the automated policy module 304 and backup customization module 306 in order to determine the backup policies in place and the particular files selected for backup. The file management module 308 formats selected files for storage and sends the files, using the network interface 312, to an off-site location. In some implementations, a storage management module 330 coordinates with various internet resources to allocate the backup files to particular storage locations, keeping a record of where each backup file is stored for later retrieval.

The administration module 156 may, in some embodiments, be located wholly or partially in an internet server 140A in order to maintain connectivity with a plurality of backup modules each associated with a different client device.

As described above, a system profile repository 322 receives data representing the system condition of various client systems being backed up. In some implementations, the system profile repository may reflect an organized database of user records associated with information about each profile's system. System data in the repository 322 may be anonymized but may be kept as coherent profiles in order to better identify new backup policies as further described below.

As described above, a customization repository 324 receives data representing the customization of the backup procedures as carried out by a variety of users for different client systems. Customization data in the repository 324 may be anonymized, but various customization records may still be stored and associated with a single user in order to provide sufficient data to better identify new backup policies as further described below.

System profile and customization information may be aggregated and compared by means of a behavior correlation module 326. That is, for a commonly observed customization behavior found for a subset of the records in the customization repository 324, the system profile repository 322 can be consulted to determine if a significant portion of the systems in which a particular behavior is observed include any similarities in profile. The behavior correlation module 326 may then translate any such patterns into one or more additional default policies.

As an example, analysis of customization data within the repository may show that files having the extension ".iep" are backed up by certain users. The behavior correlation module 326 may then access the system profile repository 322 and determine that a particular program, Image Editor Pro 7, is a listed application in more than 70% of the profiles where filed of the listed extension are backed up. The behavior correlation module 326 may then generate an automated backup policy in accordance with the identified correlation—for systems that have Image Editor Pro 7 installed, files within the ".iep" extension should be backed up. Similar correlations can be made based on such information as when files were created, or by what process.

In some implementations, a policy management module 328 may manage the automated policies for all of the backup modules in communication with the administration module 156. The policy management module 328 maintains the most current set of automated backup policies, modifying and adding policies as new significant correlations are determined by the behavior correlation module 326. The policy management module 328 may be responsible for determining which backup modules 154 associated with particular client devices are fully up-to-date.

In some implementations, the policy management module 328 may supply each particular automated policy module 304 only a set of policies associated with that client's system profile rather than a set of contingent policies. Rather than each automated policy module 304 in each backup module 154 including policies for all possible system profiles, in this system embodiment the full set of possible policies along with their profile dependencies are stored centrally in the administration module 156. Each backup module 154 sends its unique system profile as generated by the system profile module 302 and receives a set of policies for management by the automated policy module 304 that are particularly selected for that client system based on the system profile.

Figure 4:
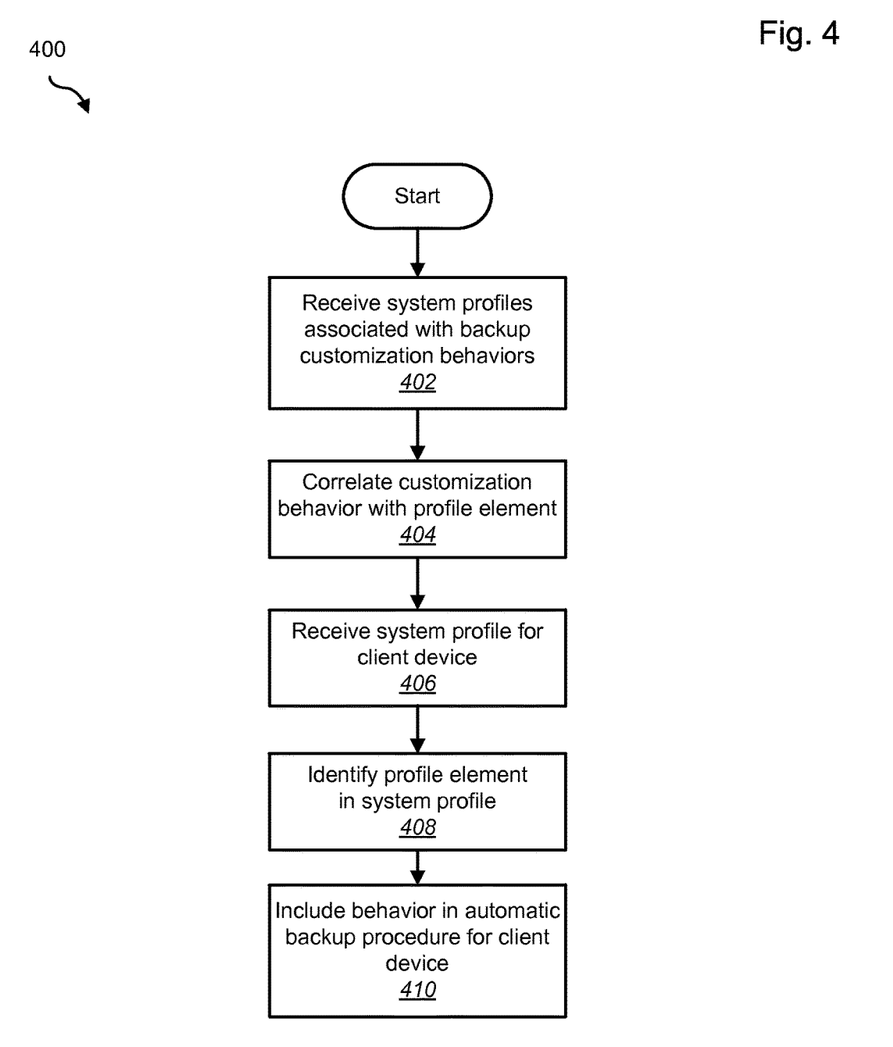
FIG. 4 shows a method for file backup in accordance with an embodiment of the present disclosure.

FIG. 4 illustrates a method 400 for backing up files in accordance with some embodiments of the disclosure. It will be understood that a variety of methods are possible within the scope of what has been described, and the following method 400 is given for illustrative purposes only. The steps described may be performed by any appropriate centralized system such as an administration module 156 as described above.

A plurality of system profiles and associated backup customization behaviors are received (402). This "crowd" of data is used to identify and apply modifications to the default backup policies specific to particular groups of users. Each customization behavior is identified with a particular system profile so that it is possible to search for correlations as described above and herein. Notably, each customization behavior represents a deviation from whatever default policies were in practice for that client during that backup procedure.

The system correlates a particular repeated customization behavior with a particular profile element (404). In some implementations, these correlations may require that behavioral frequency among the identified subgroup exceed the control rate of the behavior by an established threshold. One of ordinary skill in the art will recognize that a variety of known statistical sampling and behavioral learning techniques can be used to distinguish genuine behavioral correlation.

Subsequently to establishing a particular correlation between status and behavior, a particular system profile is received (406). This may be a new profile or an update for an existing profile. Most notably, the profile exhibits the profile element (408).

Because the profile for the client device includes the profile element that is correlated to a particular customization behavior, the system automatically includes the customization behavior as part of the default backup procedure for the client device (410). For example, where other users of a particular operating system were shown to customize their preferences by backing up .gif files even when such files are not automatically backed up, the system may automatically designate .gif files for backup when a client is identified using the particular operating system.

In addition to system data, it will be understood that profile data could be expanded to include demographic and other data connected with a particular user (user age, location, gender, occupation, preferences, etc.), which could again be searched to find correlation between particular elements of the system and/or user and particular customization behaviors.

At this point it should be noted that techniques for system backup in accordance with the present disclosure as described above may involve the processing of input data and the generation of output data to some extent. This input data processing and output data generation may be implemented in hardware or software. For example, specific electronic components may be employed in backup modules, administration modules, or similar or related circuitry for implementing the functions associated with system backup in accordance with the present disclosure as described above. Alternatively, one or more processors operating in accordance with instructions may implement the functions associated with system backup in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-implemented method for performing a backup procedure, the method comprising:

accessing, by a processing device, a data storage device storing data associated with backup procedures performed for a plurality of computing devices, each of the computing devices corresponding to a user of a plurality of users, wherein said data is an aggregation of data from a plurality of client devices indicative of how users deviated from a default backup procedure and system profile data corresponding to the plurality of client devices;

analyzing, by the processing device, the data associated with the backup procedures to identify customizations applied to the backup procedures by the users, the customizations comprising manual modifications made by the users to default backup procedures of the plurality of computing devices;

correlating, by the processing device, system profile data of each of the plurality of client devices associated with the backup procedures with corresponding deviations from default backup procedures;

receiving a request from a first client device associated with a given user to perform a backup of data stored on the first client device, the given user not being one of said users;

receiving a first system profile corresponding to the first client device, the first system profile including an indication of one or more characteristics of the data stored on the first client device;

in response to determining the first system profile does not include a characteristic that correlates with the one or more characteristics of the system profile data associated with the backup procedures, performing a given default backup procedure of the backup data stored on the first client device; and in response to determining the first system profile does include a characteristic that correlates with the one or more characteristics of the system profile data associated with the backup procedures:

automatically modifying, without intervention by the given user, the given default backup procedure to generate a modified backup procedure different from the given default backup procedure; and performing the modified backup procedure.

2. The method of claim 1, wherein the particular characteristic is the presence of a particular application.

3. The method of claim 1, wherein determining the first system profile does include a characteristic that matches the one or more characteristics of the system profile data associated with the backup procedures comprises:

determining the first system profile indicates the data stored on the first client device includes files having a particular extension type that is not automatically identified for backup by the given default backup procedure; and determining the manual modifications made by the users include an indication to backup files having the particular extension type.

4. The method of claim 1, further comprising providing, by the processing device, backup policies including both the given default backup procedure and the modified backup procedure.

5. The method of claim 1, wherein modifying the given default backup procedure to generate a modified backup procedure comprises modifying the default backup procedure to include one or more files reflecting recent user interaction with the one or more files.

6. The method of claim 1, wherein the particular characteristic is one or more of a an identification of a given application stored on the first client device, demographic data associated with a user of the first client device, and a type of data stored on the first client device.

7. At least one non-transitory processor readable storage medium storing a computer program of instructions configured to be readable by at least one processor for instructing the at least one processor to execute a computer process for performing the method as recited in claim 1.

8. An article of manufacture comprising:

at least one processor readable storage medium; and instructions stored on the at least one medium;

wherein the instructions are configured to be readable from the at least one medium by at least one processor and thereby cause the at least one processor to operate so as to:

access a data storage device storing data associated with backup procedures performed for a plurality of computing devices, each of the computing devices corresponding to a user of a plurality of users, wherein said data is an aggregation of data from a plurality of client devices indicative of how users deviated from a default backup procedure and system profile data corresponding to the plurality of client devices;

analyze the data associated with the backup procedures to identify customizations applied to the backup procedures by the users, the customizations comprising manual modifications made by the users to default backup procedures of the plurality of computing devices;

correlate system profile data of each of the plurality of client devices associated with the backup procedures with corresponding deviations from default backup procedures;

receive a request from a first client device associated with a given user to perform a backup of data stored on the first client device, the given user not being one of said users;

receive a first system profile corresponding to the first client device, the first system profile including an indication of one or more characteristics of the data stored on the first client device;

in response to determining the first system profile does not include a characteristic that correlates with the one or more characteristics of the system profile data associated with the backup procedures, performing a given default backup procedure of the backup data stored on the first client device; and in response to determining the first system profile does include a characteristic that correlates with the one or more characteristics of the system profile data associated with the backup procedures:

automatically modify, without intervention by the given user, the given default backup procedure to generate a modified backup procedure different from the given default backup procedure; and perform the modified backup procedure.

9. The article of claim 8, wherein the particular characteristic is the presence of a particular application.

10. The article of claim 8, wherein to determine the first system profile does include a characteristic that matches the one or more characteristics of the system profile data associated with the backup procedures, the instructions cause the at least one processor to:
- determine the first system profile indicates the data stored on the first client device includes files having a particular extension type that is not automatically identified for backup by the given default backup procedure; and
- determine the manual modifications made by the users include an indication to backup files having the particular extension type.

11. The article of claim 8, wherein the instructions further cause the at least one processor to provide backup policies including both the given default backup procedure and the modified backup procedure.

12. The article of claim 8, wherein modifying the given default backup procedure to generate a modified backup procedure comprises modifying the default backup procedure to include one or more files reflecting recent user interaction with the one or more files.

13. The article of claim 8, wherein the particular characteristic is a one or more of an identification of a given application stored on the first client device, demographic data associated with a user of the first client device, and a type of data stored on the first client device.

14. A system comprising:
- one or more processors communicatively coupled to a network; wherein the one or more processors are configured to:
  - access a data storage device storing data associated with backup procedures performed for a plurality of computing devices, each of the computing devices corresponding to a user of a plurality of users, wherein said data is an aggregation of data from a plurality of client devices indicative of how users deviated from a default backup procedure and system profile data corresponding to the plurality of client devices;
  - analyze the data associated with the backup procedures to identify customizations applied to the backup procedures by the users, the customizations comprising manual modifications made by the users to default backup procedures of the plurality of computing devices;
  - correlate system profile data of each of the plurality of client devices associated with the backup procedures with corresponding deviations from default backup procedures;
  - receive a request from a first client device associated with a given user to perform a backup of data stored on the first client device, the given user not being one of said users;
  - receive a first system profile corresponding to the first client device, the first system profile including an indication of one or more characteristics of the data stored on the first client device;
  - in response to determining the first system profile does not include a characteristic that correlates with the one or more characteristics of the system profile data associated with the backup procedures, performing a given default backup procedure of the backup data stored on the first client device; and
  - in response to determining the first system profile does include a characteristic that correlates with the one or more characteristics of the system profile data associated with the backup procedures:
    - automatically modify, without intervention by the given user, the given default backup procedure to generate a modified backup procedure different from the given default backup procedure; and
    - perform the modified backup procedure.

15. The system of claim 14, wherein the particular characteristic is the presence of a particular application.

16. The system of claim 14, wherein to determine the first system profile does include a characteristic that matches the one or more characteristics of the system profile data associated with the backup procedures, the one or more processors are configured to:
- determine the first system profile indicates the data stored on the first client device includes files having a particular extension type that is not automatically identified for backup by the given default backup procedure; and
- determine the manual modifications made by the users include an indication to backup files having the particular extension type.

17. The system of claim 14, wherein the one or more processors are further configured to provide backup policies including both the given default backup procedure and the modified backup procedure.

18. The system of claim 14, wherein modifying the given default backup procedure to generate a modified backup procedure comprises modifying the default backup procedure to include one or more files reflecting recent user interaction with the one or more files.

19. The system of claim 14, wherein the particular characteristic is a one or more of an identification of a given application stored on the first client device, demographic data associated with a user of the first client device, and a type of data stored on the first client device.

* * * * *